(12) United States Patent
Peckholdt et al.

(10) Patent No.: US 8,050,999 B2
(45) Date of Patent: Nov. 1, 2011

(54) LENDER ANONYMITY SECURITIES LENDING USING LENDER TRADE CRITERIA

(75) Inventors: Keith Peckholdt, West Islip, NY (US); Thomas Veneziano, Staten Island, NY (US); Steven Winter, Staten Island, NY (US)

(73) Assignee: Bank of America Corporation, Charlotte, NC (US)

( * ) Notice: Subject to any disclaimer, the term of this patent is extended or adjusted under 35 U.S.C. 154(b) by 379 days.

(21) Appl. No.: 11/782,822

(22) Filed: Jul. 25, 2007

(65) Prior Publication Data
US 2009/0030826 A1    Jan. 29, 2009

(51) Int. Cl.
*G06Q 40/00* (2006.01)
(52) U.S. Cl. .............. 705/37; 705/35; 705/36 R; 705/38
(58) Field of Classification Search .................... 705/37, 705/35, 36 R, 38
See application file for complete search history.

(56) References Cited

U.S. PATENT DOCUMENTS

| | | | | |
|---|---|---|---|---|
| 6,016,482 A | * | 1/2000 | Molinari et al. | 705/35 |
| 7,475,046 B1 | * | 1/2009 | Foley et al. | 705/74 |
| 2004/0111358 A1 | * | 6/2004 | Lange et al. | 705/37 |
| 2006/0184446 A1 | * | 8/2006 | Ross | 705/37 |
| 2007/0118455 A1 | * | 5/2007 | Albert et al. | 705/37 |
| 2007/0282734 A1 | * | 12/2007 | Huntley et al. | 705/37 |

OTHER PUBLICATIONS www.dtcc.com. "DTCC: FICC Proposes Bringing Central Counterparty Capabilities to Mortgage-Backed Securities Processing". New York. Jun. 18, 2003.*

* cited by examiner

*Primary Examiner* — Muriel Tinkler
(74) *Attorney, Agent, or Firm* — Michael A. Springs; Moore & Van Allen PLLC; James C. Edwards

(57) ABSTRACT

Lender anonymity securities lending where trade criteria associated with a security owned by a client are determined. Bids for the security are monitored by a first entity. A trade related to the security is executed by accepting a best bid from the monitored bids based on the trade criteria. An identical trade related to the security is automatically executed with a second entity. A second identical trade as the trade related to the security is automatically executed with inter-dealer brokers without any knowledge of the first entity. The first entity may be a banking division of a financial institution and the second entity may be a broker/dealer division of a financial institution. Complete anonymity is provided to the client from the inter-dealer brokers since the trade executed automatically with the second entity is put into a separate trading book maintaining a firewall between the client and the inter-dealer brokers.

27 Claims, 3 Drawing Sheets

LENDER ANONYMITY SECURITIES LENDING USING LENDER TRADE CRITERIA

BACKGROUND

Two commonly used types of securities lending models include an agent lending model and a principal lending model. In the agent lending model, the lender acts as agent for its clients and lends bonds directly to the dealers. In this case, the name of the underlying client is usually known to the dealer. The client has virtually no decision in the securities to lend or how they are lent. In this model, dealers contact the lenders requesting to borrow a security. If the lender has a client with that security in their portfolio, the lender lends the bonds to the dealer. Therefore, the client gets a financing rate based on a single dealer and not the best rate available in the market. The securities lenders do not have access to the inter-dealer broker screens.

In the principal lending model, the dealer borrows the securities from the client and lends the securities to other brokers and dealers, thus acting as principal to the client. There is anonymity between the client and other market participants, but client anonymity within the dealer's organization cannot be assured, especially since the client's activity is managed on a trading desk. In this model, the dealer has valuable information regarding client positions and supply in a security. This information could be used to make proprietary trading decisions by the dealer. The lending activity in the principal lending model is also subject to the dealer's balance sheet restrictions.

SUMMARY

According to one aspect of the present invention, a method for securities lending includes: determining trade criteria associated with a security owned by a client, monitoring bids for the security by a first entity and executing a trade related to the security by accepting a best bid from the monitored bids based on the trade criteria, automatically executing an identical trade as the trade related to the security with a second entity, and automatically executing a second identical trade as the trade related to the security with inter-dealer brokers without any knowledge of the first entity.

According to another aspect of the present invention, a system for securities lending includes: a client entity, the client entity determining trade criteria related to a security of a user; a first entity, the first entity receiving the trade criteria and the security from the client entity and monitoring bids for the security, the first entity executing a trade related to the security by accepting a best bid from the monitored bids based on the trade criteria; a second entity, the first entity automatically executing an identical trade as the trade related to the security with a second entity; and at least one inter-dealer broker, the second entity automatically executing a second identical trade as the trade related to the security with the at least one inter-dealer broker without any knowledge of the first entity.

According to still another aspect of the present invention, a system for securities lending includes: means for determining trade criteria associated with a security owned by a client; means for monitoring bids for the security by a first entity and executing a trade related to the security by accepting a best bid from the monitored bids based on the trade criteria; means for automatically executing an identical trade as the trade related to the security with a second entity; and means for automatically executing a second identical trade as the trade related to the security with inter-dealer brokers without any knowledge of the first entity.

Moreover, according to a further aspect of the present invention a computer program product comprising a computer useable medium having computer useable program code embodied therewith, the computer useable program code comprising: computer useable program code configured to determine trade criteria associated with a security owned by a client; computer useable program code configured to monitor bids for the security by a first entity and executing a trade related to the security by accepting a best bid from the monitored bids based on the trade criteria; computer useable program code configured to automatically execute an identical trade as the trade related to the security with a second entity; and computer useable program code configured to automatically execute a second identical trade as the trade related to the security with inter-dealer brokers without any knowledge of the first entity.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
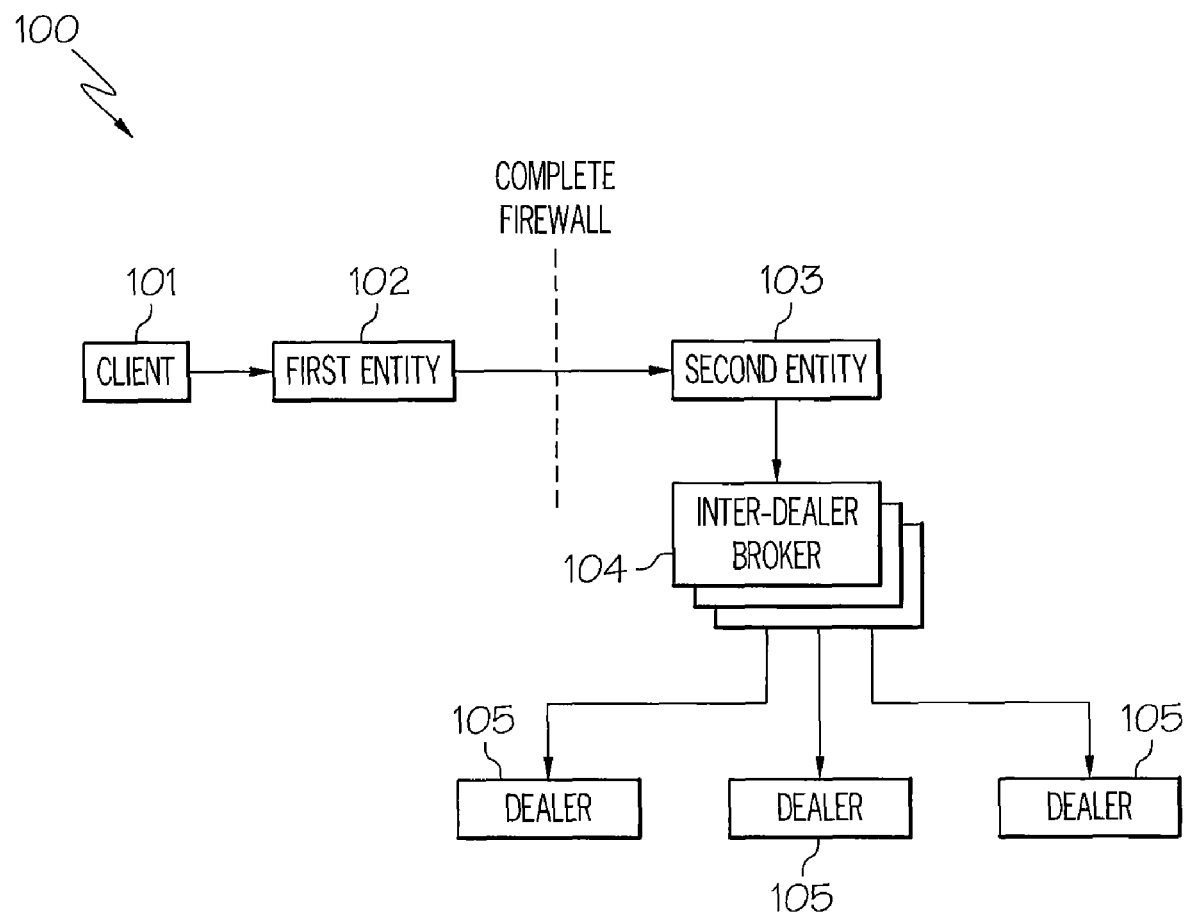
FIG. 1 is a system for securities lending according to an example embodiment of the present invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device;

or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, a securities lending system provides a client with direct control over the lending process for their portfolio based on preset rules that the client can set when desired, e.g., on a daily basis. Since the lending activity occurs through the inter-dealer broker screens, the client gets the best rates available on their securities. However, the lending activity is done in a way that ensures complete anonymity to all market participants, including internal and external broker/dealer desks. More importantly, the lending activity is designed to eliminate possible disruptions and manipulative practices in the markets that could occur by lending large amounts of securities inappropriately. Also, unlike the principal lending model mentioned previously, according to embodiments of the present invention, these trades are completely off balance sheet since a balance sheet can be netted if trades are done with the same counterparty, for the same end date. This will be the case with all trades with a client according to embodiments of the present invention. Embodiments according to the present invention also utilize the netting of settlements and balance sheet through the Fixed Income Clearing Corp (FICC).

Moreover, in securities lending systems according to embodiments of the present invention, a securities lending program may include a client trade criteria algorithm, which enables clients to control the lending of their portfolio. The rules included in this algorithm may relate to client selected criteria such as, for example, what security to lend, what total principal to lend, how much principal to lend in each incremental trade, what is the maximum tenor, what is the minimum desired spread, what type of collateral to accept for the reinvestment of cash, how long does the order stay effective, what is the spread compression trigger, etc. The spread compression trigger is the maximum basis points the trade should execute away from the current market spread. This minimizes market disruption.

Embodiments of the present invention include processes that assure a client complete anonymity to the market place and that eliminate any reputation risk the client could have in an environment of increased regulatory scrutiny. These two components may be extremely important to a client base being targeted by a financial institution, particularly clients such as central banks and institutions with large bond holdings.

Moreover, embodiments according to the present invention ensure that recommendations in the Treasury Market Best Practices document complied by the Treasury market Practice Group (TMPG) are adhered to (e.g., practices related to promoting market making and liquidity, maintaining a robust control environment to monitor questionable trading practices, managing large positions with care, etc.). Features in embodiments according to the present invention of the client, e.g., determining trade criteria to be used in trades of securities of the client, aid in compliance with the recommendations of the TMPG.

FIG. 1 shows a system for securities lending according to an example embodiment of the present invention. The system 100 may include a client entity 101, a first entity 102, a second entity 103, one or more inter-dealer brokers 104, and one or more dealers 105. A client or user may determine trade criteria that the client desires to be used and/or followed regarding the lending of a security owned by the client. The terms "client" and "user" will be used interchangeably to illustrate the present invention. The client entity 101 may be the client/user or may be a processing device used by the client/user. The client entity may send these trade criteria associated with the security to the first entity 102 along with the security to be traded, or may enter the trade criteria into a processing device for sending to the first entity 102.

The first entity 102 may monitor bids for the security and execute a trade related to the security by accepting a best bid from the monitored bids based on the trade criteria. An identical trade as the trade related to the security may be executed automatically with the second entity 103. These trades are all put into a separate trading book (subsidiary) maintaining a complete firewall between the client entity 101, the second entity 103, and the inter-dealer brokers 104 (and also the dealers 105). A second identical trade as the trade related to the security may be executed automatically with the inter-dealer brokers 104 independent of first entity. The one or more inter-dealer brokers 104 may conduct trades with the one or more dealers 105.

According to embodiments of the present invention, the first entity 102, the second entity 103, and the inter-dealer brokers 104 may each be a processing device that performs the above-mentioned actions or a person or group at the entity or a brokerage that performs the activities. Moreover, in embodiments of the present invention where the client entity 101, the first entity 102, the second entity 103, and the inter-dealer brokers 104 are each a processing device, responsive to the trade criteria being defined, the functions and activities regarding the bid monitoring, bid selection, and trading may occur automatically. To help illustrate the present invention, embodiments will be discussed where the first entity may be part of a financial institution and the second entity may be part of a financial institution. However, in embodiments according to the present invention, the first entity 101 and the second entity 102 may not be a part of or related to a financial institution, but may be any other type of entity that performs the same functions.

Figure 2:
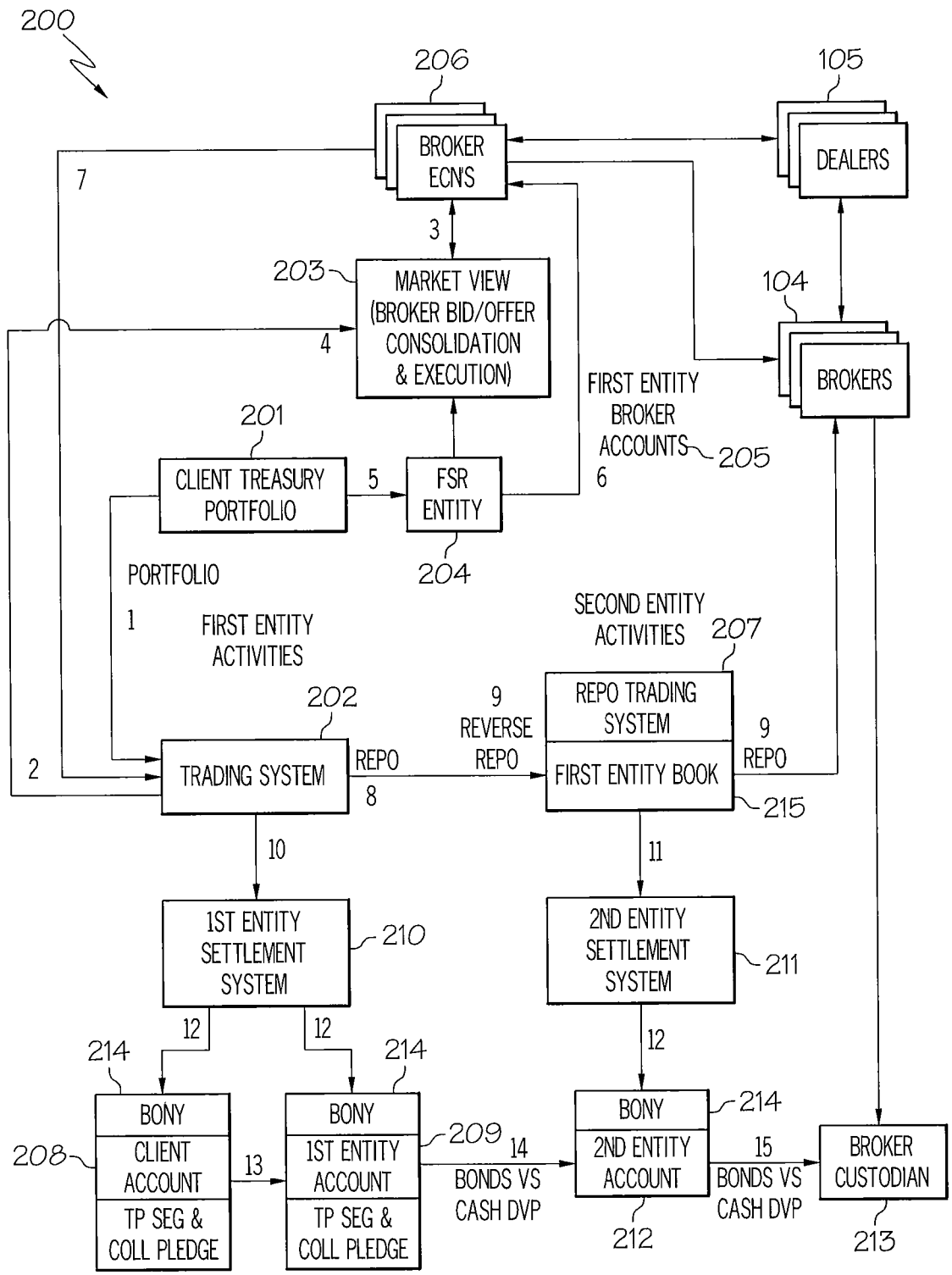
FIG. 2 is trade flow in a system according to an example embodiment of the present invention.

FIG. 2 shows trade flow in a system according to an example embodiment of the present invention. In the system 200, a client delivers a portfolio of securities 201 free to a financial institution first entity account 208 at a clearance institution 214, (e.g., Bank of New York (BONY), State Street Bank, etc.). Each security may be processed as a buy in a trade management system 202 (e.g., Denarius) to record the security inventory and track the security positions (1). The trading system 202 may send periodic inventory updates to a combined inter-dealer broker trade system 203 (e.g., Market View) that displays multiple inter-dealer bids/offers on one or more screens. This allows the client portfolio of securities to be matched up with broker bids (2). Bids and offers from broker electronic communication networks (ECN's) 206 are consolidated in the combined inter-dealer broker trade system (3). Best bids and offers may be highlighted based on client preferences set up in the system (4).

A financial services representative (FSR) entity 204 may double check the broker bids for the security in the client's portfolio to ensure the displayed bid is the best bid for the client (5). The FSR entity 204 may be a processing device that monitors best bids and offers based on the client trade preferences, and automatically selects a best bid, or the FSR entity 204 may be a person that performs these tasks. The FSR entity 204 may "hit the bid" in the inter-dealer broker trade system 203, which may feed back to the broker ECN 206. If the broker 104 is a phone broker not linked to the inter-dealer broker trade system 203, the FSR may "hit the bid" in the broker ECN 206 with the best bid. This may be done through a financial institution first entity account 205 with the broker 104 (6). The inter-dealer broker trade system 203 may send the completed trade with the broker 104 to appropriate internal systems.

The broker ECN's 206 may feed a repo trading system 207, (e.g., Anvil ARTS) directly. The trades done in with the FSR entity 204 (logon specific) may be redirected to the trading system 202 (e.g., Denarius) rather than to the repo trading system 207 (e.g., ARTS) (7). The trading system 202 may take the repo done with the broker 104 and create a series of trades. Initially, a repo may be done from the client's account 208 of the financial institution first entity 101 to an inventory account 209 of the financial institution first entity 101. Another repo may be created from the first entity inventory account 209 to a second entity account 212 (8).

The trading system 202 may feed a back-to-back trade over its existing feed to the repo system 207. This books a combination reverse repo with the first entity and a repo with the original broker. This may occur at the same time so that a long or short position is not created in the repo system 207. Also, these trades may all be put into a separate trading book 215 (subsidiary) in the repo system 207 to maintain the firewall to the broker/dealer trading and sales groups (9). The trading system 202 may send client repo trade to the first entity 102 and the first entity trade to the second entity down to a first entity settlement system 210 (10). The repo system 207 may send the reverse repo with the first entity and the repo to the broker down to a second entity settlement system 211 (11). The various settlement systems 210, 211 may feed its trades down the clearance institution 214, a dealer clearance institution used by the first entity 102 and the second entity 103 (12). The repo from client may be delivered to the first entity inventory account 209 (13). The repo from first entity may be delivered to the second entity inventory account 212 (14). The repo may also be delivered from the second entity inventory account 212 to a broker custodian 213. All settlements between the first entity, the second entity, and the street (i.e., brokers) preferably compare and net in FICC (formerly, the Government Securities Clearing Corporation (GSCC)) (15).

Figure 3:
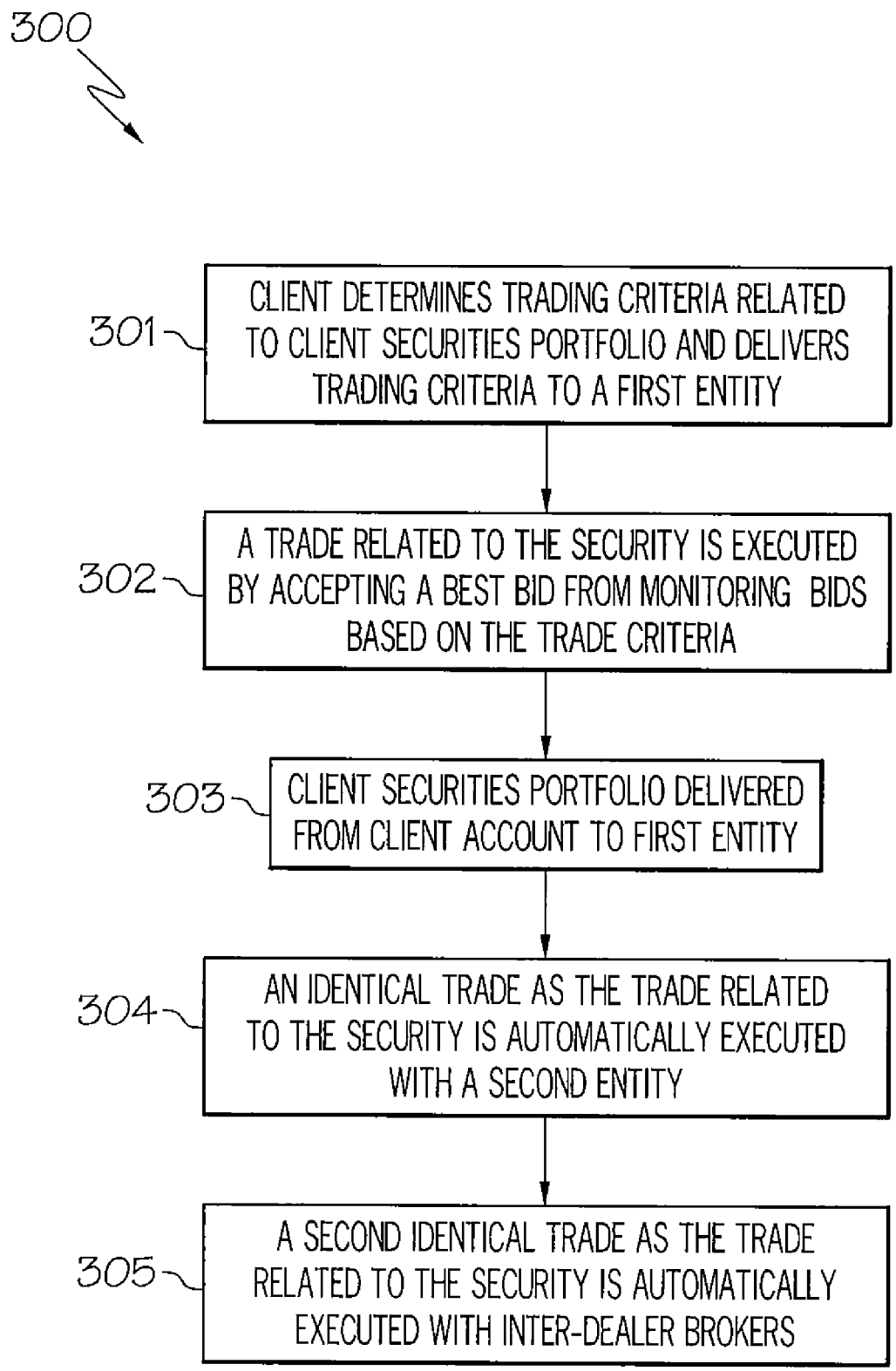
FIG. 3 is a flowchart showing a process for securities trading according to an example embodiment of the present invention.

FIG. 3 is a flowchart showing a process for securities trading according to an example embodiment of the present invention. In the process 300, in block 301, a client may determine trading criteria that the client desires related to a securities portfolio of the client and deliver the trading criteria to a first entity. In block 302, a trade related to the security may be executed by accepting a best bid from bids monitored that meet the trade criteria. In block 303, the client securities portfolio may be delivered from a client account to the first entity. In block 304, an identical trade as the trade related to the security may be automatically executed with a second entity. In block 305, a second identical trade as the trade related to the security may be automatically executed with inter-dealer brokers. In one embodiment of the present invention, the first entity and the second entity may each be part of a financial institution. In other embodiments of the present invention, the first entity and the second entity may each be part of a different financial institution, or not part of a financial institution.

Embodiments according to the present invention provide an automated process for identifying lending criteria utilizing proprietary algorithms and trading rules. Moreover, embodiments according to the present invention isolate the client from any perception of regulatory infractions or manipulative behavior and ensure the market best practices are followed. In addition, embodiments according to the present invention isolate securities lending activity from a financial institution's trading and finance groups.

Further, since the client's motivation is aligned with that of the financial institution, there is no inherent trading conflict. Embodiments according to the present invention also ensures the client complete anonymity to the market and hidden from the broker/dealer community. Embodiments according to the present invention ensure price transparency and increased market depth and create objective measures for clients to measure the performance of their existing lenders. Embodiments according to the present invention provide the client with the absolute best market bids and offers available through the inter-dealer broker at the time of lending. Preferably, there is no competing securities lending platform at the financial institution.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for securities lending comprising:
   receiving, at a computing device, client-defined trade criteria associated with a client security wherein the trade criteria includes at least one of maximum tenor, minimum desired spread, type of collateral to accept, length in time an order stays effective or spread compression trigger;
   monitoring, at a computing device, bids for the security by a first entity;
   executing, via a computing device processor, a first trade related to the security by accepting a bid from the monitored bids based on the trade criteria;
   automatically executing, via a computing device processor, a second trade identical to the first trade between the first entity and a second entity; and
   automatically executing, via a computing device processor, a third trade identical to the first and second trades between the second entity and an inter-dealer broker without any knowledge of the first entity.

2. The method according to claim 1, further comprising receiving the security and the client-defined trade criteria at the first entity.

3. The method according to claim 1, wherein complete anonymity is provided to the client from the inter-dealer broker and a reputation risk to the client is mitigated.

4. The method according to claim 1, wherein automatically executing the second trade further comprises communicating, via a computing device, information related to the second trade to a separate trading book maintaining a firewall between the client and the inter-dealer broker.

5. The method according to claim 1, wherein monitoring the bids further comprises monitoring the bids, at the computing device, using a system that provides consolidated display screens of bids and offers and wherein executing the first trade further comprises executing, via the computing device processor, the first trade related to the security using the system that provides consolidated display screens of bids and offers.

6. The method according to claim 1, wherein executing the first trade further comprises executing a first re-purchase (repo) trade related to the security with the first entity.

7. The method according to claim 6, wherein automatically executing the second trade further comprises automatically executing, via the computing device processor, a second re-purchase (repo) trade identical to the first re-purchase trade between the first entity and the second entity.

8. The method according to claim 1, wherein the first entity comprises a banking division of a financial institution.

9. The method according to claim 1, wherein the second entity comprises a broker/dealer division of a financial institution.

10. The method according to claim 1, wherein automatically executing the third trade further comprises automatically executing, via the computing device processor, the third trade between the second entity and the inter-dealer brokers through Fixed Income Clearing Corporation (FICC).

11. The method according to claim 1, wherein monitoring the bids further comprises monitoring the bids, at the computing device, using a display screen displaying consolidated views of bids/offers from a plurality of brokers and dealers and wherein executing the first trade further comprises executing, via the computing device processor, the first trade related to the security using the display screen displaying consolidated views of bids/offers from the plurality of brokers and dealers.

12. The method according to claim 1, further comprising providing trade fail mitigation that guarantees the client settlement of the first trade.

13. The method according to claim 12, wherein providing the trade fail mitigation further comprises providing the trade fail mitigation through trading and finance functions of a financial institution.

14. The method according to claim 1, wherein executing the first trade further comprises executing, via the computing device processor, the first trade off balance sheet of trading and finance functions of a financial institution.

15. A computing device apparatus for securities lending comprising:
   a memory;
   at least one processor; and
   a securities trade application stored in the memory, executable by the processor and configured to receive client-defined trade criteria related to a client security, monitor bids for the security by a first entity, execute a first trade related to the security by accepting a bid from the monitored bids based on the trade criteria, automatically execute a second trade identical to the first trade related to the security between the first entity and a second entity, and automatically execute a third trade identical to the first and second trades between the second entity and at least one inter-dealer broker without any knowledge of the first entity,
   wherein the trade criteria includes at least one of maximum tenor, minimum desired spread, type of collateral to accept, length in time an order stays effective or spread compression trigger.

16. The computing device apparatus according to claim 15, wherein complete anonymity is provided to the client from the inter-dealer brokers and a reputation risk to the client is mitigated.

17. The computing device apparatus according to claim 15, wherein the security trading application is further configured communicate information related to the second trade to a separate trading book maintaining a firewall between the client and the at least one inter-dealer broker.

18. The computing device apparatus according to claim 15, wherein the security trading application is further configured to execute a first re-purchase (repo) trade related to the security with the first entity.

19. The computing device apparatus according to claim 18, wherein the security trading application is further configured to automatically execute a second re-purchase (repo) trade with the second entity.

20. The computing device apparatus according to claim 15, wherein the first entity comprises a banking division of a financial institution.

21. The computing device apparatus according to claim 15, wherein the second entity comprises a broker/dealer division of a financial institution.

22. A computer program product comprising a non-transitory computer useable medium having computer useable program code embodied therewith, the computer useable program code comprising:

computer useable program code configured to receive client-defined trade criteria associated with a security owned by a client, wherein the trade criteria includes at least one of maximum tenor, minimum desired spread, type of collateral to accept, length in time an order stays effective or spread compression trigger;

computer useable program code configured to monitor bids for the security by a first entity;

computer useable program code configured to execute a first trade related to the security by accepting a bid from the monitored bids based on the trade criteria;

computer useable program code configured to automatically execute a second trade identical to the first trade between the first entity and a second entity; and computer useable program code configured to automatically execute a third trade identical to the first and second trades between the second entity and an inter-dealer broker without any knowledge of the first entity.

23. The computer program product according to claim 22, wherein the computer useable program code configured to automatically execute the second trade further comprises computer useable program configured to communicate information related to the second trade to a separate trading book maintaining a firewall between the client and the inter-dealer broker.

24. The computer program product according to claim 22, wherein the computer useable program code configured to execute the first trade further comprises computer useable program code configured to execute a first re-purchase (repo) trade related to the security with the first entity.

25. The computer program product according to claim 24, wherein the computer useable program code configured to automatically execute the second trade further comprises computer useable program code configured to automatically execute a second re-purchase (repo) trade identical to the first re-purchase trade between the first entity and the second entity.

26. The computer program product according to claim 22, wherein the computer useable program code configured to automatically execute the third trade further comprises the computer useable program code configured to automatically execute the third trade between the second entity and the inter-dealer brokers through Fixed Income Clearing Corporation (FICC).

27. The computer program product according to claim 22, further computer useable program code configured to provide trade fail mitigation that guarantees the client settlement of the first trade.

* * * * *